United States Patent
Lapinski et al.

(10) Patent No.: US 11,597,883 B2
(45) Date of Patent: Mar. 7, 2023

(54) PROCESS FOR REMOVING OLEFINS FROM NORMAL PARAFFINS IN AN ISOMERIZATION EFFLUENT STREAM

(71) Applicant: UOP LLC, Des Plaines, IL (US)

(72) Inventors: Mark Lapinski, Aurora, IL (US); Ram Ganesh Rokkam, Visakhapatnam (IN); Gregory Funk, Carol Stream, IL (US)

(73) Assignee: UOP LLC, Des Plaines, IL (US)

( * ) Notice: Subject to any disclaimer, the term of this patent is extended or adjusted under 35 U.S.C. 154(b) by 39 days.

(21) Appl. No.: 17/341,161

(22) Filed: Jun. 7, 2021

(65) Prior Publication Data

US 2022/0389335 A1    Dec. 8, 2022

(51) Int. Cl.
  C10G 61/02    (2006.01)
  C10G 69/08    (2006.01)
  B01D 15/08    (2006.01)
  B01D 3/14     (2006.01)

(52) U.S. Cl.
  CPC ............. *C10G 61/02* (2013.01); *B01D 3/143* (2013.01); *B01D 15/08* (2013.01); *C10G 69/08* (2013.01); *C10G 2400/28* (2013.01)

(58) Field of Classification Search
  None
  See application file for complete search history.

(56) References Cited

U.S. PATENT DOCUMENTS

| | | | | |
|---|---|---|---|---|
| 3,625,879 A | * | 12/1971 | Horne | C10G 69/08 208/68 |
| 5,453,552 A | * | 9/1995 | Rice | C10G 69/08 585/737 |
| 11,046,898 B1 | * | 6/2021 | Koseoglu | C10G 69/06 |
| 2018/0155638 A1 | * | 6/2018 | Al-Ghamdi | C10G 7/06 |
| 2018/0340125 A1 | * | 11/2018 | Funk | C10G 61/04 |
| 2020/0407655 A1 | * | 12/2020 | Penninger | C10G 59/02 |
| 2022/0220397 A1 | * | 7/2022 | Koseoglu | C10G 11/18 |

* cited by examiner

*Primary Examiner* — Tam M Nguyen
(74) *Attorney, Agent, or Firm* — Paschall & Associates, LLC; James C. Paschall

(57) ABSTRACT

Favorable isomerization conditions for producing normal paraffins can produce olefins. The process for separating normal paraffins from non-normal paraffins by adsorption has a limit on olefin concentration, so the olefins must be removed. We propose to remove olefins from the isomerization effluent stream that is recycled to the adsorption separation process.

17 Claims, 6 Drawing Sheets

PROCESS FOR REMOVING OLEFINS FROM NORMAL PARAFFINS IN AN ISOMERIZATION EFFLUENT STREAM

FIELD

The field is processes for increasing the concentration of normal hydrocarbons in a feed stream.

BACKGROUND

Ethylene and propylene are important chemicals for use in the production of other useful materials, such as polyethylene and polypropylene. Polyethylene and polypropylene are two of the most common plastics found in use today and have a wide variety of uses. Uses for ethylene and propylene include the production of vinyl chloride, ethylene oxide, ethylbenzene and alcohol.

The great bulk of the ethylene consumed in the production of the plastics and petrochemicals such as polyethylene is produced by the thermal cracking of higher molecular weight hydrocarbons. Steam is usually mixed with the feed stream to the cracking furnace to reduce the hydrocarbon partial pressure and enhance olefin yield and to reduce the formation and deposition of carbonaceous material in the cracking reactors. The process is therefore often referred to a steam cracking or pyrolysis.

The composition of the feed to the steam cracking reactor affects the product distribution. The propensity of particular hydrocarbons to crack is greater than others. The tendency of the hydrocarbons to crack to propylene normally ranks in the following order normal paraffins; iso-paraffins; olefins; naphthenes; and aromatics. Benzene and other aromatics are particularly resistant to steam cracking and undesirable as cracking feed stocks, with only the alkyl side chains being cracked to produce the desired product.

The feed to a steam cracking unit is also normally a mixture of hydrocarbons varying both by type of hydrocarbon and carbon number. This variety makes it difficult to separate less desirable feed components, such as naphthenes and aromatics, from the feed stream by fractional distillation. The normal paraffins and the non-normal paraffins can be separated by an adsorption process. Increasing the concentration of normal paraffins in a stream can improve the quality of a feedstock to the steam cracking unit.

Common feeds to steam crackers include light naphtha, which is concentrated in C5-C6 hydrocarbons, and LPG, which comprises C3-C4 hydrocarbons. Light naphtha streams typically contain a mixture of n-paraffins, iso-paraffins, naphthenes and aromatics. It is generally not possible to procure light naphtha streams that are concentrated in n-paraffins. Similarly, LPG streams typically contain a mixture of n-butane, iso-butane, and propane, but streams concentrated in n-butane are not commonly available.

One way to upgrade the normal paraffin concentration in light naphtha is first to separate the naphtha into a normal paraffin rich stream and a non-normal paraffin rich stream, and subsequently convert a substantial amount of the non-normal paraffin stream in an isomerization unit in the presence of a catalyst into normal paraffins. We have reported at appropriate conditions disproportionation and cracking reactions can accompany the isomerization reactions which can increase the production of normal paraffins.

An efficient process for separating and converting the iso-paraffins in light naphtha to normal paraffins would significantly increase the profitability of steam cracking operations by increasing the yield of high value ethylene and propylene.

BRIEF SUMMARY

We have discovered that favorable isomerization conditions can produce olefins. The process for separating normal paraffins from non-normal paraffins by adsorption has a limit on olefin concentration, so the olefins must be removed. We propose to remove olefins from the isomerization effluent stream that is recycled to the adsorption separation process.

Additional details and embodiments of the disclosure will become apparent from the following detailed description of the disclosure.

DETAILED DESCRIPTION

The present disclosure endeavors to separate normal paraffins from a light naphtha stream comprising C4-C7 paraffins for an ideal steam cracker feed. The process employs a separation of normal paraffins from non-normal hydrocarbons to extract normal paraffins from the light naphtha stream and may transport the normal paraffins to a steam cracking unit. Furthermore, the non-normal hydrocarbons are converted to normal paraffins and may also be transported to a steam cracking unit. Mixed C4+ paraffins from isomerization can be recycled back to the normal-non-normal separation to separate and provide normal paraffins.

To increase concentration of normal paraffins in a naphtha stream, we have found that high temperature favors normal paraffin equilibrium. In combination with low hydrogen partial pressure to avoid hydrogen recycle, high temperature can generate trace olefins in the isomerization effluent stream. A recycle stream from the isomerization effluent stream may be recycled to an adsorption separation unit which has a limit on olefins of a Bromine Index of 150 equivalent to no more than 0.09 wt % olefins. Olefins are removed from the isomerization effluent stream that is recycled to the adsorption separation process.

The term "Cx" is to be understood to refer to molecules having the number of carbon atoms represented by the subscript "x". Similarly, the term "Cx-" refers to molecules that contain less than or equal to x and preferably x and less carbon atoms. The term "Cx+" refers to molecules with more than or equal to x and preferably x and more carbon atoms.

Figure 1:
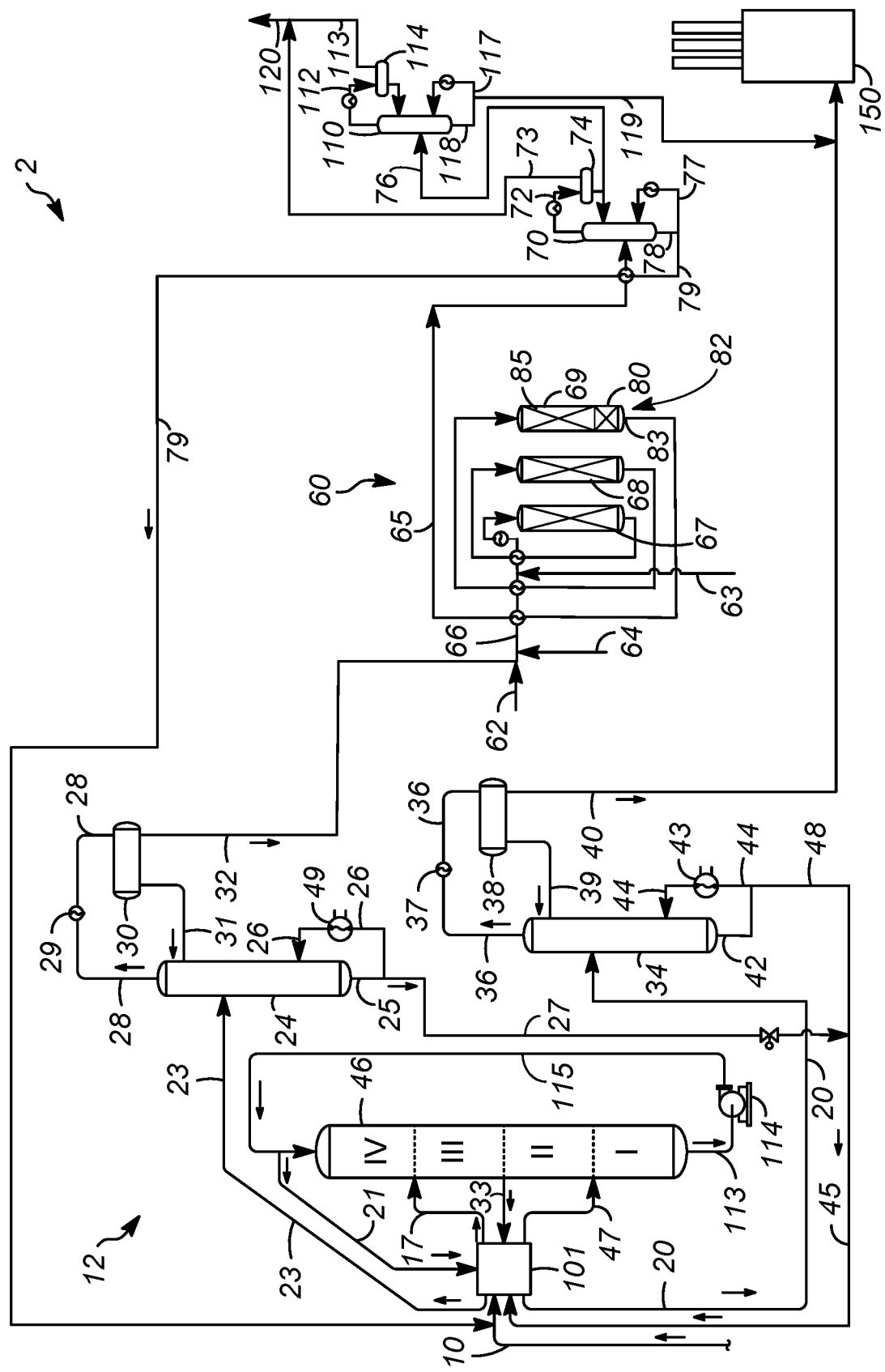
FIG. 1 is a schematic view of a conversion unit of the present disclosure.

In the process and apparatus 2 in FIG. 1, a naphtha feed stream in line 10 is preferably a hydrotreated light naphtha stream comprising substantially C4 to C7 hydrocarbons having a T90 between about 40° C. and about 90° C. The end point is taken to minimize the presence of hydrocarbons with more than six carbon atoms in the feed. Suitably no more than about 30 wt % C7+ hydrocarbons, preferably no more than about 20 wt % C7+ hydrocarbons and more preferably no more than about 10 wt % C7+ hydrocarbons may be present in the light naphtha feed stream. The naphtha feed stream may comprise normal paraffins, iso-paraffins, naphthenes, and aromatics.

Normal paraffins yield more light olefins in a steam cracking unit. Hence, it is desired to increase the concentration of normal paraffins in the feed stream 10. The first step in the process is a step of separating the naphtha feed stream into a normal paraffin-rich stream and a non-normal paraffin-rich stream. Normal molecules are defined to mean straight chain molecules such as normal butane, normal hexane, and normal pentane. The most efficient process for such a separation utilizes adsorption. In an aspect, an adsorbent separation unit 12 is used to separate normal paraffins from non-normal paraffins.

As used herein, the term "a component-rich stream" or "a component stream" means that the stream coming out of a vessel has a greater concentration of the component than the feed to the vessel. As used herein, the term "a component-lean stream" means that the lean stream coming out of a vessel has a smaller concentration of the component than the feed to the vessel.

The naphtha feed stream is delivered to the process in a feed line 10 and passed to the adsorbent separation unit 12. The feed stream in feed line 10 is passed through a valve 101 in the adsorbent separation unit 12 which delivers the feed to an appropriate bed in an adsorbent vessel 46.

The feed stream in feed line 10 is separated into a normal paraffins stream and a non-normal paraffins stream. Normal paraffins of the naphtha mixture selectively enter or occlude into the porous structure of the adsorbent components but branched or cyclic non-normal chain paraffins do not typically enter the pores. The non-normal paraffins exit the process as a raffinate stream. In an aspect, the normal paraffins enter or occlude into the porous structure of the adsorbent components while the non-normal paraffins do not typically enter the pores.

To provide a useful method for separation of normal from non-normal paraffins, it is necessary to desorb the occluded normal paraffins. In the disclosed process, normal nonane or normal decane or even heavier normal paraffin can suitably be used as a desorbent to desorb normal paraffins in an extract-desorbent stream.

The adsorbent used in the adsorbent vessel preferably comprises aluminosilicate molecular sieves having relatively uniform pore diameters of about 5 Angstroms. The preferred adsorbent is provided by commercially available type 5 A molecular sieves produced and sold by UOP LLC in Des Plaines, Ill.

The adsorbent vessel 46 may comprise a series of vertically spaced, separate beds interconnected by a pipe 115 between the bottom of one bed and the top of its upstream adjacent bed. The valve 101 may comprise a manifold arrangement or a rotary valve for advancing the points of inlet and outlet of respective streams in a downstream direction. The adsorbent vessel 46 operates in an downflow mode, although upflow may be suitable. The adsorbent vessel 46 is shown to have four main zones I-IV for simplicity, though these zones may be further subdivided when accounting for different flushing schemes. The overall process may have other numbers of beds, such as eight, twelve or twenty-four beds, divided among the four main zones I-IV.

The feed stream is introduced through feed line 10 through valve 101 which is positioned to send the feed stream through line 47 into the adsorbent vessel 46 between Zones I and II. The extract is withdrawn between Zones II and III in line 33, transported through the valve 101 in an extract line 20 to an extract fractionation column 34 to separate desorbent from extract. The desorbent is introduced through desorbent line 45 through the valve 101 which is positioned to send the desorbent through a desorbent line 17 into the process between Zones III and IV. The raffinate is withdrawn between Zones IV and I through a raffinate line 21, through the valve 101 and through line 23 to the raffinate fractionation column 24.

Simulated countercurrent flow is achieved by periodically advancing downstream the introduction point of the feed stream and the desorbent stream while simultaneously and equally advancing downstream the withdrawal point of the raffinate stream and the extract stream. The Zone I is defined as the zone bounded between the feed stream inlet and the raffinate outlet; the Zone II is defined as the zone bounded between the extract stream outlet and the desorbent inlet; the Zone III is defined as the zone bounded between the desorbent inlet and the extract outlet; and the Zone IV is defined as the zone bounded between the raffinate stream outlet and the desorbent stream inlet. Typical liquid phase operation is preferred, for example, at temperatures from about 50° C. to about 300° C., and more particularly no more than about 260° C., and pressures from slightly superatmospheric to about 30 atmospheres.

Raffinate, characterized as comprising molecules less adsorbed in the adsorbent vessel 46, is withdrawn from the adsorbent vessel 46 in the raffinate line 21 through the valve 101 and enters the raffinate fractionation column 24 through line 23. Since it is desired to obtain a normal paraffin product, the raffinate fractionation column 24 is operated to separate two fractions, a raffinate overhead stream rich in non-normal paraffins, in an embodiment, rich in C7-non-normal paraffins, and a desorbent bottoms stream rich in normal paraffin desorbent, in an embodiment, rich in C9+ normal paraffins. The raffinate overhead stream is withdrawn from the raffinate fractionation column 24 in an overhead line 28, condensed in a cooler 29 and fed to a separator 30. A portion of the condensed raffinate overhead is recycled to the raffinate fractionation column 24 as reflux through a reflux line 31 and the remaining portion of the condensed raffinate overhead is withdrawn through a net raffinate overhead line 32. The net raffinate overhead stream is rich in non-normal C7-paraffins which can be transported to the isomerization unit 60 as the non-normal paraffin rich stream. Alternatively, the net raffinate overhead stream in the overhead line 28 may be fully condensed and fully refluxed in line 31 and the non-normal paraffin rich stream can be taken in a side cut from the raffinate column 24.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Unless indicated otherwise, overhead lines and bottoms lines refer to the net lines from the column downstream of any reflux or reboil take-off to the column. Stripper columns may omit a reboiler at a bottom of the column and instead provide heating requirements and separation impetus from a fluidized inert media such as steam.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure. The term "communication" means that fluid flow is operatively permitted between enumerated components, which may be characterized as "fluid communication". The term "downstream communication" means that at least a portion of fluid flowing to the subject in downstream communication may operatively flow from the object with which it fluidly communicates.

The raffinate bottoms stream is withdrawn from the raffinate fractionation column 24 through a bottoms line 25 where a portion of the raffinate bottoms stream flows through a reboiler line 26, reboiler heater 49 and returns heated to the raffinate fractionation column 24. The remaining portion of the raffinate bottoms stream flows through a net bottoms line 27 as a normal paraffin rich stream, particularly rich in normal C9+ paraffins. The raffinate bottoms stream comprising a raffinate desorbent stream in line 27 can be recycled to the adsorbent vessel 46 in the desorbent line 45 perhaps after joining an extract bottoms stream in line 48. The raffinate fractionation column 24 operates in a bottoms temperature range of about 250 to about 290° C. and an overhead pressure of about 450 to about 550 kPa (gauge).

Extract comprises molecules more selectively adsorbed on the adsorbent in the adsorbent vessel 46. The desorbent displaces the selectively adsorbed normal paraffins from the solid adsorbent in desorbent bed III of adsorbent vessel 46. The extract and desorbent are withdrawn in line 33, and the valve 101 connects line 33 with line 20. Extract and desorbent withdrawn from the adsorbent vessel in the extract line 33 connected through the valve 101 is directed in line 20 to the extract fractionation column 34. Since it is desired to obtain a normal paraffin product, the extract fractionation column 34 is operated to separate two fractions, an extract overhead stream rich in normal paraffins, in an embodiment, rich in C4-C7 normal paraffins, and a desorbent bottoms stream rich in normal paraffin desorbent, in an embodiment, rich in C9+ normal paraffins. The extract overhead stream is withdrawn from the extract fractionation column 34 in an overhead line 36, condensed in a cooler 37 and fed to a separator 38. A portion of the condensed extract overhead stream is recycled to the extract fractionation column 34 as reflux through a reflux line 39 and the remaining portion of the condensed extract overhead stream is withdrawn through a net extract overhead line 40. The extract overhead stream is rich in C4-C7 normal paraffins which can be recovered or taken as steam cracker feed and fed to the steam cracker unit 150 in line 40.

The extract bottoms stream is withdrawn from extract fractionation column 34 through a bottoms line 42 where a portion of the extract bottoms stream flows through a reboiler line 44, reboiler heater 43 and returns heated to the extract fractionation column 34. A remaining portion of the extract bottoms stream flows through line 48 as a normal paraffin rich stream, particularly rich in normal C9+ paraffins. The extract bottoms stream in line 48 comprising an extract desorbent stream can join the raffinate bottoms stream in line 27 comprising a raffinate desorbent stream. Both can be recycled in the desorbent line 45 through the valve 101 to the adsorbent vessel 46 in the desorbent line 17. The extract fractionation column 34 operates in bottoms temperature range of about 225 to about 275° C. and an overhead pressure of about 250 to about 350 kPa (gauge).

The non-normal paraffin rich stream particularly rich in non-normal C4 to C7 paraffins which may be taken in the net raffinate overhead stream in the net raffinate overhead line 32 can be isomerized to increase the concentration of normal C4 to C7 paraffins to equilibrium levels. In one embodiment, the non-normal paraffin rich stream may be fractionated by a debutanizer column (not shown) into a C4 stream that is taken as the isomerization feed stream in which case some or all of the C5-C7 non-normal paraffins may be taken as an additional isomerization stream that is separately isomerized in an additional isomerization reactor to improve normal paraffin concentration. In another embodiment, the non-normal paraffin rich stream may be fractionated in a depentanizer column into a C4-C5 stream that is taken as the isomerization feed stream in which case some or all of the C6-C7 non-normal paraffins may be taken as the additional isomerization stream that is separately isomerized in the additional isomerization reactor to improve normal paraffin concentration. In another embodiment, the non-normal paraffin rich stream may be fractionated in a raffinate splitter column into a C4-C6 stream that is taken as the isomerization feed stream or separate a C4 stream that is isomerized in a first isomerization unit and a C5-C6 stream that is isomerized in a higher isomerization unit. In such an embodiment, the raffinate splitter column may be employed to remove C6 cyclic hydrocarbons, such as cyclohexane, methylcyclopentane and benzene, and C7 non-normal paraffins in a net splitter bottoms stream that can be taken to a reforming unit to produce aromatic hydrocarbons or sent to the steam cracker 150. In a further embodiment, the entire non-normal paraffin rich stream particularly rich in non-normal C4 to C7 paraffins may be taken as isomerization feed stream.

We have discovered that the conversion of non-normal hydrocarbons to normal paraffins in an isomerization unit 60 can be increased by increasing the isomerization temperature. Specifically, by increasing the temperature disproportionation reactions occur which lead to increased amounts of valuable propane and butanes, as well as increases in the per pass conversion of the iso-paraffin hydrocarbons in the feed to normal paraffins. The products from the disproportionation reactions undergo isomerization reactions leading to an increase in yields of normal paraffins. Furthermore, additional conversion to C2 to C4 normal paraffins in the non-normal paraffin rich stream is accomplished via hydrocracking reactions in the isomerization unit 60. We have surprisingly found that naphthenes and aromatics fed to the isomerization unit 60 under the more severe conditions will not significantly inhibit disproportionation reactions and will undergo ring opening and be converted to n-paraffins. Accordingly, FIG. 1 will depict the embodiment in which the non-normal paraffin rich stream rich in C4-C7 non-normal paraffins is taken from the net raffinate overhead stream in the net raffinate overhead line 32 as the isomerization feed stream without any intermediate separation between the raffinate column 24, other than in the separator 30, and the isomerization unit 60. The isomerization unit 60 may be in downstream communication with the adsorption unit 12.

The non-normal paraffin rich stream in the net raffinate overhead line 32 may be combined optionally with a fresh isobutane stream in a fresh isobutane line 62 and with a hydrogen stream in a hydrogen line 64 to provide an isomerization feed stream in an isomerization feed line 66.

In the isomerization unit 60, isoparaffins and non-normal hydrocarbons in the presence of hydrogen provided by hydrogen line 64 and an isomerization catalyst are converted to increase the concentration of normal paraffins: ethane, propane, normal butane, normal pentane and normal hexane. Four reactions promote the production of normal paraffins from iso-paraffins; disproportionation reactions, ring opening of aromatics, via preliminary saturation, and cyclics, reverse isomerization of iso-paraffins, and paraffin hydrocracking reactions.

The conversion of isopentane and/or isohexane increases significantly via disproportionation reactions due to the higher temperature in the isomerization reactors 67-69. It is believed that the paraffin disproportionation reactions occur by the combination of two iso-paraffins followed by scission into one lighter hydrocarbon and one heavier hydrocarbon. For example, two isopentanes can combine and form an isobutane and an isohexane in the presence of hydrogen. The isobutanes can further react via disproportionation to form propanes and isopentanes. A portion of the produced isobutanes can also convert to normal butanes via isomerization reactions in the isomerization unit. Production of normal propane and butane via disproportionation and isomerization reactions occurs with low production of low-value undesired methane as a cracked product. Thus, there is an increase in the overall yield of the normal paraffins in the first isomerization unit 60.

In the isomerization unit 60, hydrocracking of the isopentane and/or isohexane occurs to produce methane, ethane, propane, and isobutane. The isobutane can further react via disproportionation reactions and/or isomerization reactions to further produce normal paraffins.

The isomerization catalyst in the isomerization unit 60 may include chlorided alumina, sulfated zirconia, tungstated zirconia or zeolite-containing isomerization catalysts. The isomerization catalyst may be amorphous, e.g., based upon amorphous alumina, or zeolitic. A zeolitic catalyst would still normally contain an amorphous binder. The catalyst may comprise a sulfated zirconia and platinum as described in U.S. Pat. No. 5,036,035 and EP 0666109 A1 or a platinum group metal on chlorided alumina as described in U.S. Pat. Nos. 5,705,730 and 6,214,764. Another suitable catalyst is described in U.S. Pat. No. 5,922,639. U.S. Pat. No. 6,818,589 discloses a catalyst comprising a tungstated support of an oxide or hydroxide of a Group IVB (IUPAC 4) metal, preferably zirconium oxide or hydroxide, at least a first component which is a lanthanide element and/or yttrium component, and at least a second component being a platinum-group metal component. An advantage of a non-chlorided catalyst, such as a sulfated zirconia catalyst, is the absence of chloride omitting further treatment of the effluent streams from the isomerization unit 60. If chlorided alumina catalyst is used as the isomerization catalyst, a chloriding agent in line 63 will be added to the isomerization feed stream 66.

The isomerization process conditions in the isomerization unit 60 include an elevated average reactor temperature that ranges from about 160° to about 250° C. Reactor operating pressures generally range from about 689 kPa (100 psig) to about 3.8 MPa (550 psig) (gauge). Weight hourly space velocities (WHSV) range from about 1 to about 6 $hr^{-1}$ based on mass feed rate and catalyst weight. Hydrogen is admixed with or remains with the isomerization feed stream to the isomerization unit to preferably provide a mole ratio of hydrogen to hydrocarbon in the isomerization effluent stream of from about 0.05 to about 1, so just sufficient hydrogen is provided to promote isomerization but avoid the need for a hydrogen recycle stream and the associated recycle compressor. The hydrogen may be supplied totally from outside the process or, in an alternative embodiment, supplemented by hydrogen recycled to the feed after separation from isomerization reactor effluent stream.

Conversion of isobutanes, isopentanes and isohexanes may all be above equilibrium. Isobutane conversion, isopentane conversion or isohexane conversion may be at least 20% in the isomerization unit 60.

Contacting within the isomerization unit 60 may be effected using the isomerization catalyst in a fixed-bed system, a moving-bed system, a fluidized-bed system, or in a batch-type operation. The reactants may be contacted with the bed of isomerization catalyst particles in upward, downward, or radial-flow fashion. The reactants may be in the liquid phase, a mixed liquid-vapor phase, or a vapor phase when contacted with the isomerization catalyst particles, with a mixed phase or vapor phase being preferred. The isomerization unit 60 may be in a single reactor 67 or in two or more separate isomerization reactors 67, 68, and 69 with suitable means therebetween to ensure that the desired isomerization temperature is maintained at the entrance to each reactor. The isomerization reactors 67-69 may be in downstream communication with the adsorbent vessel 46.

The reactions in the isomerization unit 60 generate an exotherm across the reactors, so the isomerization effluent streams must be cooled between reactors. For example, a first isomerate stream from a first isomerization reactor 67 may be heat exchanged with the isomerization feed stream in the isomerization feed line 66 to cool the first isomerate stream and heat the isomerization feed stream. Moreover, a second isomerate stream from a second isomerization reactor 68 may be heat exchanged with the isomerization feed stream upstream of the heat exchange with the first isomerate steam to cool the second isomerate stream and heat the isomerization feed stream. Additionally, a third isomerate stream from the third isomerization reactor 69 may be heat exchanged with the isomerization feed stream in the isomerization feed in line 66 upstream of the heat exchange with the second isomerate stream to cool the third isomerate stream and heat the isomerization feed stream. Since hydrocracking reactions are accompanied by hydrogenation reactions that are very exothermic, two to five isomerization reactors in sequence enable improved control of individual reactor temperatures and partial catalyst replacement without a process shutdown. An isomerization effluent stream comprising an increased concentration of normal paraffins relative to the isomerization feed stream in line 66 exits the last isomerization reactor 69 in the isomerization unit 60 in an isomerization effluent line 65.

We have found that favorable isomerization reaction conditions of higher temperature and low hydrogen partial pressure can generate trace olefins in the isomerization effluent stream. Consequently, we propose to remove olefins from the isomerization effluent stream before the olefins are recycled to the adsorption separation unit 12. In an embodiment, the olefins in the isomerization effluent stream may be saturated.

To this end, a bed reactor 80 of saturation catalyst may be provided in the last isomerization reactor 69 in the isomerization unit 60 to saturate olefins produced in the isomerization unit 60. The bed reactor 80 of saturation catalyst may be located at the outlet of the last isomerization reactor 69 in the series of isomerization reactors 67-69 to ensure that all of the olefins produced in the isomerization reactors 67-69 of the isomerization unit 60 are saturated. In FIG. 1, the saturation catalyst is in the bed reactor 80 in the downstream end 82 of the last isomerization reactor 69 in the series of isomerization reactors 67-69. The bed reactor 80 is in downstream communication with the isomerization reactors 67-69 and the last isomerization catalyst bed 85 in the last isomerization reactor 69.

Suitable saturation catalysts for use in the catalyst bed reactor 80 may include any known conventional saturation catalysts. The saturation catalysts may comprise at least one Group VIII metal including iron, cobalt and nickel, or cobalt and/or nickel and optionally at least one Group VI metal including molybdenum and tungsten, on a high surface area support material such as alumina. Other suitable saturation catalysts may include noble metal catalysts in which the noble metal is selected from palladium and platinum. In an exemplary embodiment, the Group VIII metal or the noble metal may be present in an amount ranging from about 2 wt % to about 20 wt %, or from about 4 wt % to about 12 wt %. In another exemplary embodiment, the Group VI metal may be present in an amount ranging from about 1 wt % to about 25 wt %, or from about 2 wt % to about 25 wt %.

Saturation in the bed reactor 80 of saturation catalyst can advantageously take place at the isomerization conditions present in a downstream end 82 of the last isomerization reactor 69. In the embodiment of FIG. 1, the saturation catalyst bed reactor 80 is upstream of and at an outlet 83 of the last isomerization reactor 69. An average reactor temperature that ranges from about 160° to about 250° C. Reactor operating pressures generally range from about 689 kPa (100 psig) to about 3.8 MPa (550 psig) (gauge). Weight hourly space velocities (WHSV) may range from about 40 to about 50 hr$^{-1}$ based on mass feed rate and the saturation catalyst weight. Hydrogen remaining in the isomerization effluent stream at a hydrogen to hydrocarbon mole ratio of from about 0.05 to about 1 is sufficient to promote saturation of the olefins in the isomerization effluent stream.

A saturated, isomerization effluent stream is transported in the isomerization effluent line 65 to heat exchange with the isomerization feed stream in the isomerization feed line 66 and then with the recycle stream in the recycle line 79 and fed to the depropanizer column 70. A depropanizer column 70 separates a saturated isomerization effluent stream in line 65 into a depropanizer overhead stream comprising propane and a depropanized bottoms stream comprising C4+ paraffins in a single fractionation column. A depropanizer overhead stream is withdrawn from the depropanizer column 70 in a depropanizer overhead line 72 and condensed in a cooler and passed into a separator 74. A portion of the condensed depropanizer overhead stream is recycled to the depropanizer column 70 as reflux through a reflux line and the remaining portion of the condensed depropanizer overhead stream is withdrawn in a net depropanizer overhead line 76 as a propane stream. The propane stream in the line 76 may be charged as feed to the steam cracker 150 or to a paraffin dehydrogenation process (not shown) perhaps after separation of lighter components from the propane. A depropanizer off gas stream comprising C2− hydrocarbons and light gases is taken from the separator overhead in a depropanizer off-gas line 73. The depropanizer off gas in the off-gas overhead line 73 may be scrubbed (not shown) to remove chlorine if a chloride isomerization catalyst is in the isomerization unit 60 and passed to fuel gas processing or sent to further processing for further recovery of hydrogen and/or ethane which can be used as steam cracking feed to the steam cracking unit 150.

The depropanized bottoms stream is withdrawn from the depropanizer column 70 through a bottoms line 78 from which a portion of the depropanized bottoms stream flows through a reboiler line 77, a reboiler heater and returns to the depropanizer column 70. The remaining portion of the depropanized bottoms flows through a recycle line 79 rich in C4-C7 normal and iso-paraffins, and lean on or devoid of olefins, is cooled by heat exchange with the depropanizer feed stream in line 65 and is recycled to the feed line 10 and to the adsorption separation unit 12 for separation of the normal paraffins from the non-normal paraffins. The C4-C7 hydrocarbon stream may be characterized as a C4+ hydrocarbon stream. In an embodiment, the entire C4-C7 paraffin stream is recycled to the adsorption separation unit 12. The depropanizer column 70 operates in bottoms temperature range of about 90 to about 150° C. and an overhead pressure range of about 1.3 to about 2.7 MPa and preferably about 1.7 to about 2.5 MPa. The recycle line 79 may be in downstream communication with the saturation bed reactor 80. Moreover, the adsorbent vessel 46 may be in downstream communication with the recycle line 79.

In an embodiment, the propane stream in the net depropanizer overhead line 76 may be passed to a deethanizer column 110 to remove lighter materials from the propane stream before it is fed to the steam cracker 150 or fed to a separate propane dehydrogenation unit to produce propylene. The deethanizer column 110 separates the propane stream in line 76 into a deethanizer overhead stream comprising ethane and lighter materials and a deethanized propane bottoms stream comprising C3 paraffins.

A deethanizer overhead stream is withdrawn from the deethanizer column 110 in a deethanizer overhead line 112 and condensed in a cooler and passed into a separator 114. A condensed deethanizer overhead stream is recycled to the deethanizer column 110 as reflux through a reflux line. A net vaporous deethanizer overhead stream is withdrawn in a net deethanizer overhead line 113 as an ethane stream. The ethane stream in the deethanizer overhead line 113 may be joined by the depropanizer off gas stream comprising C2-hydrocarbons and light gases in the depropanizer off-gas line 73 to provide a mixed ethane stream in an ethane line 120. The mixed ethane stream in the line 120 may be charged as feed to the steam cracker 150 as is or further demethanized (not shown) to isolate a purer ethane stream for feed to the steam cracker while the demethanized overhead may be passed to fuel gas processing or sent to further processing for further recovery of hydrogen. The mixed ethane stream in the ethane line 120 may also be scrubbed (not shown) to remove chlorine if a chloride isomerization catalyst is in the isomerization unit 60.

A deethanized propane stream is withdrawn from the deethanizer column 110 through a bottoms line 118 from which a portion of the deethanized propane stream flows through a reboiler line 117, a reboiler heater and returns to the deethanizer column 110. The remaining portion of the deethanized propane stream flows through a net deethanized bottoms line 119. The net deethanized propane stream in the net deethanized bottoms line 119 may be fed to the steam cracker 150, perhaps in line 40. The deethanizer column 110 operates in bottoms temperature range of about 100 to about 130° C. and an overhead pressure range of about 1.5 to about 3 MPa (gauge).

Figure 2:
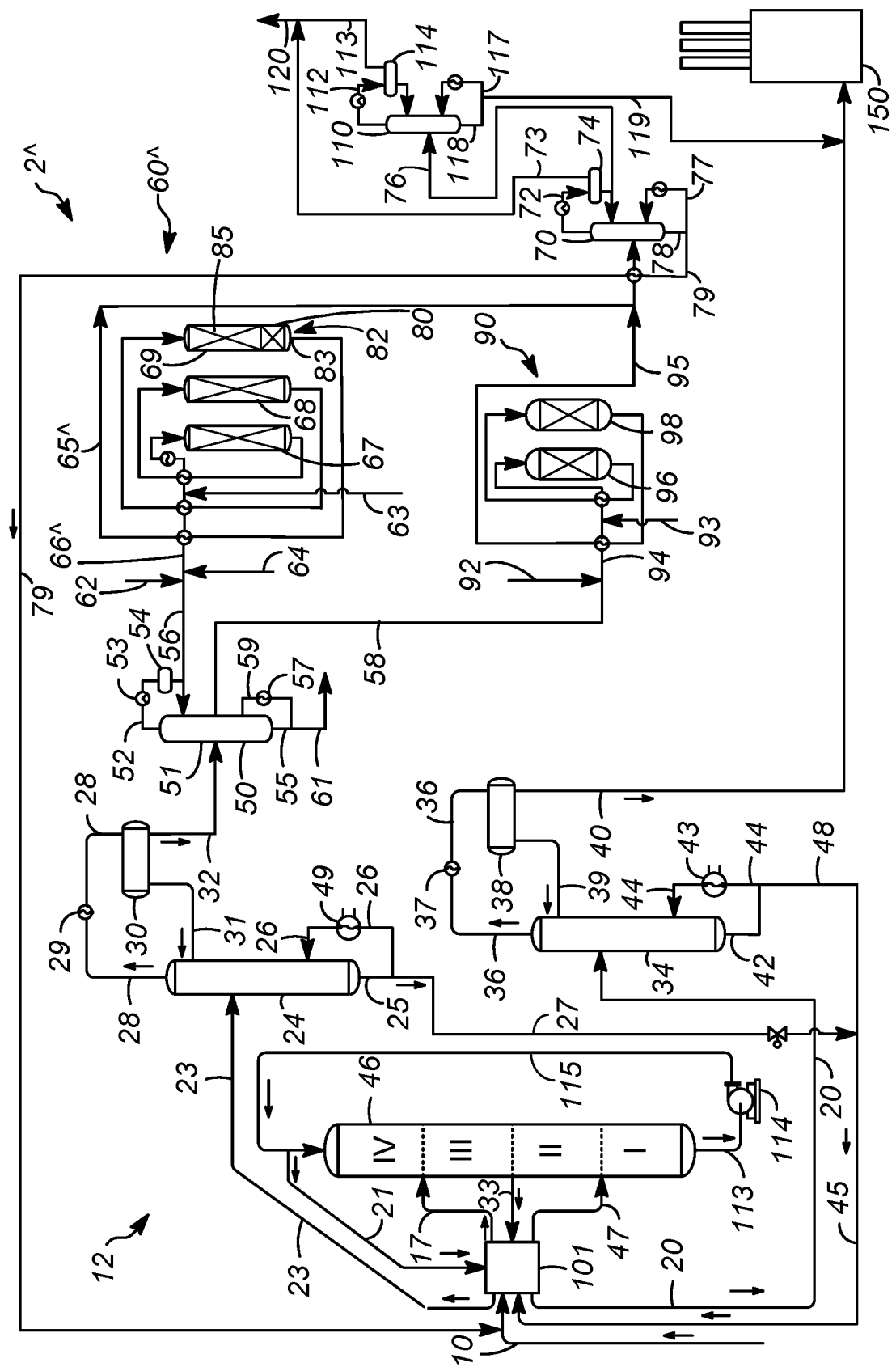
FIG. 2 is a schematic view of an alternate conversion unit of FIG. 1.

FIG. 2 depicts an alternative process and apparatus 2ˆ of FIG. 1 that employs a raffinate splitter to separate C4's from C5+'s to separately isomerize these streams. Elements in FIG. 2 with the same configuration as in FIG. 1 will have the same reference numeral as in FIG. 1. Elements in FIG. 2 which have a different configuration as the corresponding element in FIG. 1 will have the same reference numeral but designated with a carat symbol (ˆ). The configuration and operation of the embodiment of FIG. 2 is similar to that described in FIG. 1 with the following exceptions.

In the embodiment of FIG. 2, the process may install a raffinate splitter column 50 downstream of the adsorbent separation vessel 46 to separate the net raffinate overhead stream comprising non-normal paraffins in line 32 into an isobutane stream and an isopentane stream. The isopentane stream may also be rich in isohexane and be an isohexane stream. The isopentane and/or isohexane stream may be characterized as a higher isoalkane stream. The net raffinate overhead stream comprising non-normal paraffins in line 32 may also be separated into a C6 cyclic and C7+ hydrocarbons stream in the raffinate splitter column 50. Since the non-normal paraffin stream in line 32 contains little n-hexane with a normal boiling point of 69° C. because it is removed in the adsorption separation vessel 46, the separation of C6 cyclics from iso-paraffins is simplified. The lightest C6 cyclic hydrocarbon is methylcyclopentane having a normal boiling point of 72° C. whereas iso-C6 paraffins normally boil at 50-64° C. Hence, the proper ordering of separation steps obviates a difficult split between normal hexane and methylcyclopentane that would be capitally and operationally intensive and result in a loss of much of the normal hexane, which is a valuable steam cracker feed.

The raffinate splitter overhead stream in the raffinate splitter net overhead line 56 separated from the non-normal paraffin stream in line 32 is rich in isobutanes and can be termed an isobutane stream. The isobutane stream is withdrawn in a raffinate splitter overhead line 52 from an overhead of the raffinate splitter column 50 and passed through a cooler 53 and into a separator 54. A portion of the raffinate splitter overhead stream is recycled to the raffinate splitter column 50 as reflux through a reflux line and the remaining portion of the raffinate splitter overhead stream is withdrawn in a net raffinate splitter overhead line 56. The raffinate splitter overhead stream is rich in isobutane. The isobutane stream taken in the net raffinate splitter overhead line 56 from the non-normal paraffin stream in line 32 may be mixed with a fresh isobutane stream in line 62 and hydrogen in a first hydrogen line 64 and be charged as a first isomerization feed stream in line 66^ to the first isomerization unit 60^ to increase its normal-butane concentration. The operation of the first isomerization unit 60^ is essentially as is explained in the first isomerization unit 60 of FIG. 1 and produces a butane isomerate stream that is saturated in the saturation reactor 80 to provide a saturated butane isomerization effluent stream in line 65^.

The raffinate splitter side stream taken in an intermediate line 58 may be rich in isopentanes and can be termed as an isopentane stream. The raffinate splitter side stream taken in an intermediate line 58 may also be rich in isohexanes and be termed as an isohexane stream. The raffinate splitter side stream can be termed a higher isoalkane stream because it is rich in isopentane and/or isohexane. The raffinate splitter side stream comprising higher isoalkanes is withdrawn from a side 51 of the raffinate splitter column 50 in the intermediate line 58. The higher isoalkane stream may be taken in the intermediate line from the side 51 of the raffinate splitter column 50 from the non-normal paraffin stream in the net raffinate overhead line 32 and fed as a second, higher isoalkane isomerization feed stream to a second, higher isomerization unit 90 to increase its normal alkane concentration. Particularly, the higher isomerization unit 90 increases the concentration of normal pentanes and/or normal hexanes.

The raffinate splitter bottoms stream is withdrawn from raffinate splitter column 50 through a bottoms line 55 from which a portion of the raffinate splitter bottoms flows through a reboiler line 59, a reboiler heater 57 and returns to the raffinate splitter column 50. The remaining portion of the raffinate splitter bottoms stream flows through a net splitter bottoms line 61 as a cyclic hydrocarbon stream rich in cyclic C6 hydrocarbons and benzene and particularly rich in methylcyclopentane. The cyclic paraffins stream in the net splitter bottoms line 61 can be taken to a reforming unit to produce aromatic hydrocarbons or sent to the steam cracking unit 150. Any C4+ hydrocarbons produced from steam cracking or reforming the cyclic paraffins stream can be recycled to the adsorption separation unit 12. The raffinate splitter column 50 operates in a bottoms temperature range of about 124 to about 154° C. and an overhead pressure range of about 0 to about 138 kPa (gauge). It is contemplated that the raffinate splitter column 50 may just provide two streams: an overhead stream comprising butanes which is fed to the butane isomerization unit 60 and a bottoms stream comprising C5+ hydrocarbons including cyclics that is fed to the higher isomerization unit 90.

The non-normal, non-cyclic paraffin rich stream in the intermediate raffinate splitter line 58 may be combined with a hydrogen stream in a higher hydrogen line 92 and heated by heat exchange with reactor effluent and fed to a higher isomerization unit 90 in the higher isomerization feed stream in line 94. In the higher isomerization unit 90, isopentane and/or isohexane, in the presence of hydrogen provided by the higher hydrogen line 92 and a higher isomerization catalyst, are converted to increase the concentration of normal paraffins: ethane, propane, normal butane, normal pentane and normal hexane. Three reactions promote the production of normal paraffin-iso-paraffin disproportionation reactions, opening of aromatics, requiring preliminary saturation, and cyclics, reverse isomerization of iso-paraffins, and paraffin hydrocracking reactions.

Cracking of some of the paraffins can occur in the higher isomerization unit 90 to produce C4− paraffins. Moreover, the conversion of isopentane and/or isohexane increases significantly via disproportionation reactions because the non-normal, non-cyclic paraffin rich stream in the intermediate raffinate splitter line 58 is passed into the higher isomerization unit 90 lean in cyclic C6 hydrocarbons. It is believed that the paraffin disproportionation reactions occur by the combination of two iso-paraffins followed by scission into one lighter hydrocarbon and one heavier hydrocarbon. For example, two isopentanes can combine and form an isobutane and an isohexane in the presence of hydrogen. The isobutanes can further react via disproportionation to form a propanes and isopentanes. A portion of the produced isobutanes also converts to normal butanes via isomerization reactions in the isomerization unit. Production of normal propane and butane via disproportionation and isomerization reactions occurs with low production of low-value undesired methane as a cracked product. Thus, there is an increase in the overall yield of the normal paraffins in the higher isomerization unit 90.

In the higher isomerization unit 90, hydrocracking of the isopentane and/or isohexane occurs to produce methane, ethane, propane, and isobutane. The isobutane can further react via disproportionation reactions and/or isomerization to further produce normal paraffins.

The higher isomerization catalyst in the higher isomerization unit 90 may include chlorided alumina, sulfated zirconia, tungstated zirconia or zeolite-containing isomerization catalysts. The higher isomerization catalyst may be amorphous, e.g., based upon amorphous alumina, or zeolitic. A zeolitic catalyst would still normally contain an amorphous binder. The catalyst may comprise a sulfated zirconia and platinum as described in U.S. Pat. No. 5,036,035 and EP 0666109 A1 or a platinum group metal on chlorided alumina as described in U.S. Pat. Nos. 5,705,730 and 6,214,764. Another suitable catalyst is described in U.S. Pat. No. 5,922,639. U.S. Pat. No. 6,818,589 discloses a catalyst comprising a tungstated support of an oxide or hydroxide of a Group IVB (IUPAC 4) metal, preferably zirconium oxide or hydroxide, at least a first component which is a lanthanide element and/or yttrium component, and at least a second component being a platinum-group metal component. An advantage of a non-chlorided catalyst, such as a sulfated zirconia catalyst, is the absence of chloride omitting further treatment of the effluent streams from the isomerization unit 90. If chlorided alumina catalyst is used as the isomerization catalyst, a chloriding agent in line 93 may be added to the higher isomerization feed stream in line 94.

The higher isomerization process conditions in the higher isomerization unit 90 include an average reactor temperature usually ranging from about 40° to about 250° C. Reactor operating pressures generally range from about 100 kPa to 10 MPa absolute. Liquid hourly space velocities (LHSV) range from about 0.2 to about 25 volumes of hydrocarbon feed per hour per volume of catalyst. Hydrogen is admixed with or remains with the higher isomerization feed to the higher isomerization unit to provide a mole ratio of hydrogen to hydrocarbon feed of from about 0.01 to 20. The hydrogen may be supplied totally from outside the process or supplemented by hydrogen recycled to the feed after separation from higher isomerization reactor effluent.

Contacting within the higher isomerization unit 90 may be effected using the higher isomerization catalyst in a fixed-bed system, a moving-bed system, a fluidized-bed system, or in a batch-type operation. The reactants may be contacted with the bed of higher isomerization catalyst particles in upward, downward, or radial-flow fashion. The reactants may be in the liquid phase, a mixed liquid-vapor phase, or a vapor phase when contacted with the higher isomerization catalyst particles, with a mixed phase or vapor phase being preferred. The higher isomerization unit 90 may be in a single reactor 96 or in two or more separate higher isomerization reactors 96 and 98 with suitable means therebetween to ensure that the desired isomerization temperature is maintained at the entrance to each reactor.

The reactions in the higher isomerization unit 90 generate an exotherm across the reactors so the higher isomerization effluent streams need to be cooled between reactors. For example, a first higher isomerate stream from a first isomerization reactor 96 may be heat exchanged with the higher isomerization feed stream in the higher isomerization feed line 94 comprising the non-normal, non-cyclic paraffin rich stream mixed with hydrogen to cool the higher isomerate and heat the higher isomerization feed stream. Moreover, a second higher isomerate stream from a second higher isomerization reactor 98 may be heat exchanged with the higher isomerization feed stream comprising the non-normal, non-cyclic paraffin rich stream mixed with hydrogen upstream of the heat exchange with the first higher isomerate steam to cool the higher isomerate stream and heat the higher isomerization feed stream. Since hydrocracking reactions are accompanied by hydrogenation reactions that are very exothermic, two to five higher isomerization reactors in sequence enable improved control of individual reactor temperatures and partial catalyst replacement without a process shutdown. A higher isomerization effluent stream comprising an increased concentration of normal paraffins exits the last higher isomerization reactor 98 in the higher isomerization unit 90 in a higher isomerization effluent line 95.

We have found that the olefins produced in the isomerization process concentrate in the C4 olefin range. Hence, since fewer C4 olefins are produced in the higher the isomerization unit 90, the higher isomerization effluent stream in line 95 may be added to the saturated butane isomerization effluent stream in line 65^ and fed together to the depropanizer column 70. The remainder of the operation and configuration of the embodiment of FIG. 2 is as described for FIG. 1.

Figure 3:
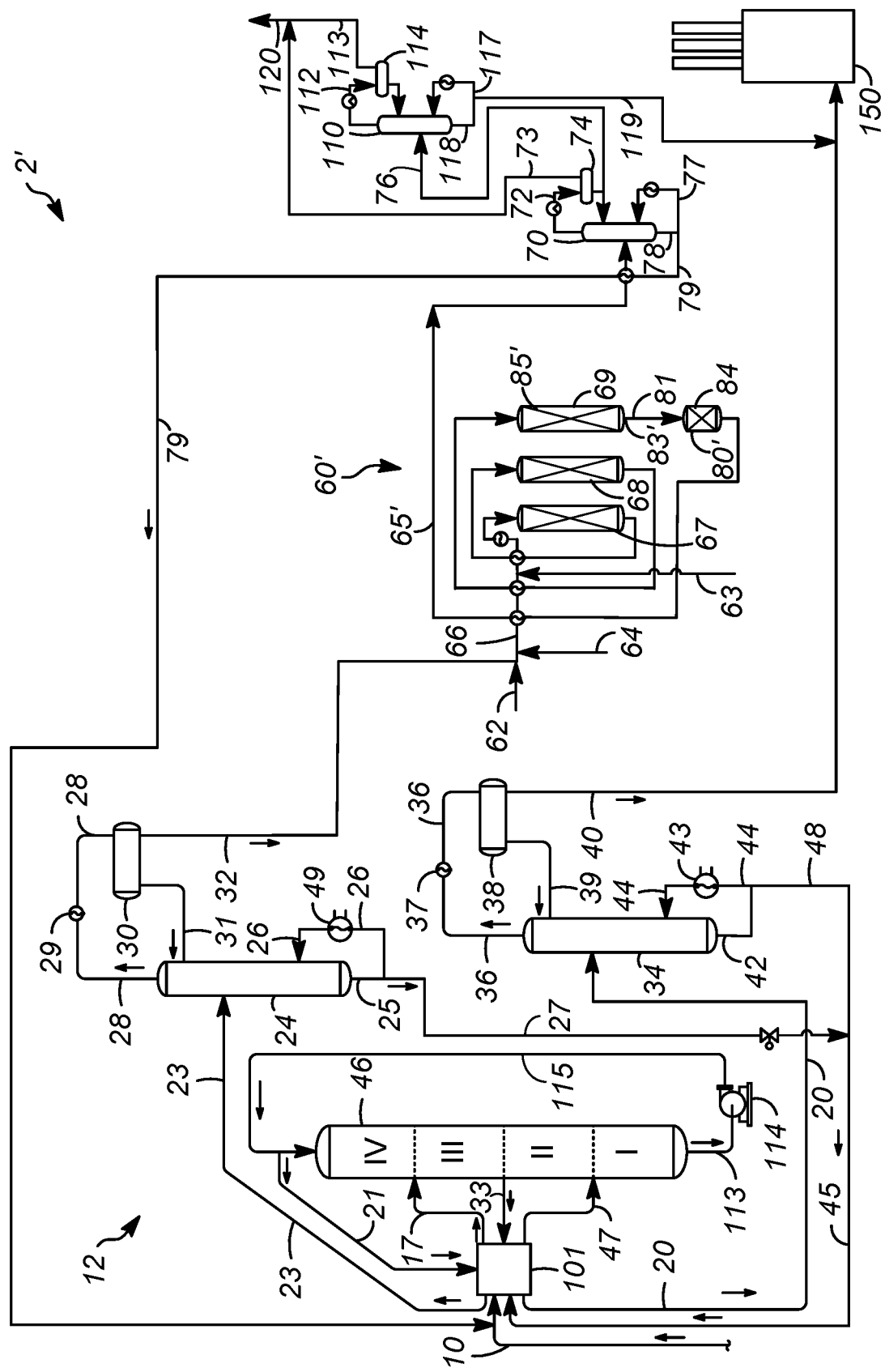
FIG. 3 is a schematic view of an alternate conversion unit of FIG. 1.

FIG. 3 shows an embodiment of a process and apparatus 2' which utilizes a saturation reactor 84 in downstream communication with the isomerization unit 60' to saturate olefins. Elements in FIG. 3 with the same configuration as in FIG. 1 will have the same reference numeral as in FIG. 1. Elements in FIG. 3 which have a different configuration as the corresponding element in FIG. 1 will have the same reference numeral but designated with a prime symbol ('). The configuration and operation of the embodiment of FIG. 3 is essentially similar to that described in FIG. 1 with the following exceptions.

In the alternative embodiment of FIG. 3, the process and apparatus 2' installs a saturation reactor 80' downstream of the last isomerization reactor 69' at the outlet 83' of the last isomerization reactor. An isomerization reactor effluent line 81 transports the isomerized effluent comprising trace olefins to the saturation reactor 80' comprising a bed 84 of saturation catalyst. In the embodiment of FIG. 3, the saturation reactor is in downstream communication with the outlet 83' of the last isomerization reactor. The conditions and catalyst in the saturation reactor 80' are as described for FIG. 1. A saturated, isomerization effluent stream is transported in the isomerization effluent line 65' to heat exchange with the isomerization feed stream in the isomerization feed line 66 and then with the recycle stream in the recycle line 79 and fed to the depropanizer column 70. The rest of the process in FIG. 3 is as is described with respect to FIG. 1. The recycle stream in the recycle line 79 is devoid of olefins and will meet the olefins limitation in the adsorption separation unit 12. The recycle line 79 may be in downstream communication with the saturation reactor 80'. Moreover, the adsorbent vessel 46 may be in downstream communication with the recycle line 79. If the separate saturation reactor 80' were to be used in the embodiment of FIG. 2, it would be located downstream of the last butene isomerization reactor 69 and be in downstream communication therewith.

Figure 4:
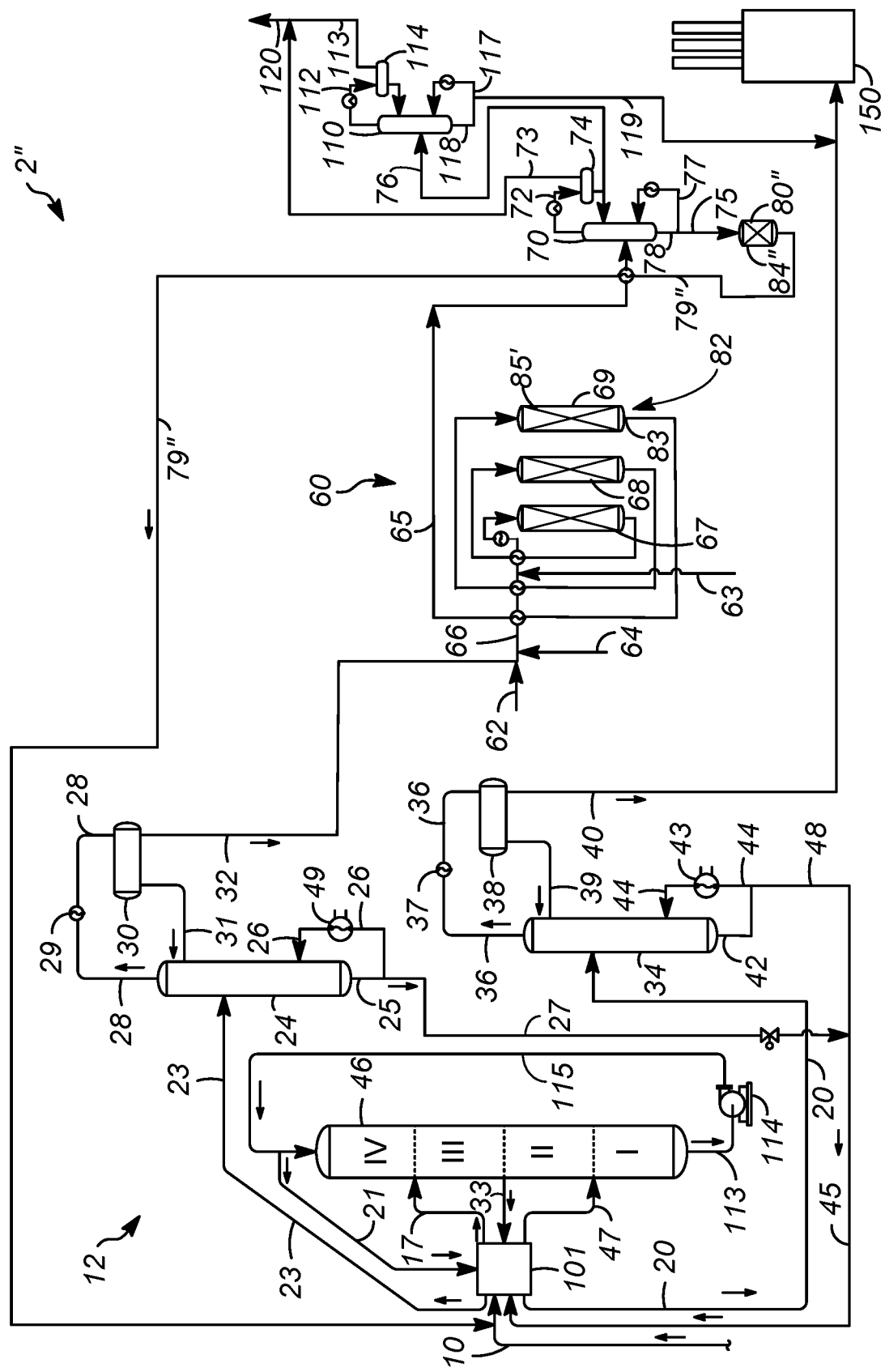
FIG. 4 is a schematic view of another alternate conversion unit of FIG. 4.

FIG. 4 shows an embodiment of a process and apparatus 2" which installs the saturation reactor 80" downstream of the depropanizer column bottoms. Elements in FIG. 4 with the same configuration as in FIG. 3 will have the same reference numeral as in FIG. 3. Elements in FIG. 4 which have a different configuration as the corresponding element in FIG. 3 will have the same reference numeral but designated with a double prime symbol ("). The configuration and operation of the embodiment of FIG. 4 is essentially the same as in FIG. 3 with the following exceptions.

A net depropanizer bottoms line 75 takes a net depropanized bottoms stream from the depropanizer bottoms line 78 and feeds it to the saturation reactor 80" comprising a bed 84" of saturation catalyst to saturate olefins in the depropanized bottoms stream before it is recycled to the adsorption separation unit 12. The saturation reactor 80" may be in downstream communication with the depropanizer bottoms line 78. The recycle line 79" carries the saturated depropanized bottoms recycle stream into heat exchange with the isomerized effluent stream and recycles the saturated depropanized bottoms recycle stream to the adsorption separation unit 12. Because the volume of the isomerization effluent stream in line 65 is further reduced in the depropanizer column 70, less feed must be processed in the saturation reactor 84".

Conditions and catalyst in the saturation reactor 84" are as described for FIGS. 1 and 2. The remainder of FIG. 4 essentially operates and is configured as described for FIGS. 1 and 3. The embodiment of FIG. 4 can also be used with the embodiment of FIG. 2 by locating the saturation reactor 80" downstream of the depropanizer column bottoms line 75.

Figure 5:
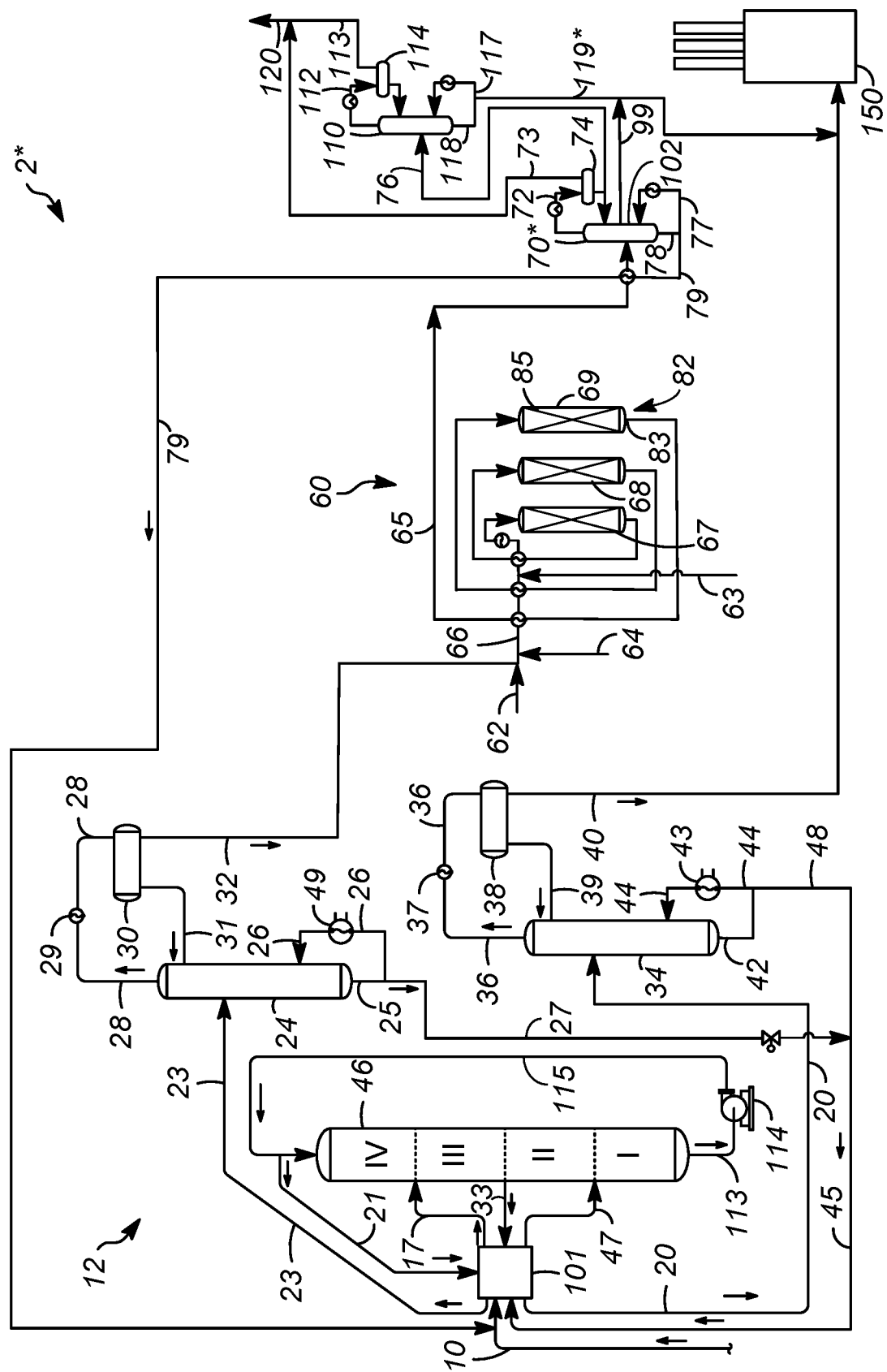
FIG. 5 is a schematic view of a further alternate conversion unit of FIG. 1.

FIG. 5 shows an embodiment of a process and apparatus 2* which employs a separation of the olefins by fractionation instead of by catalytic saturation to remove olefins from the recycle stream in recycle line 79. Elements in FIG. 5 with the same configuration as in FIG. 1 will have the same reference numeral as in FIG. 1. Elements in FIG. 5 which have a different configuration as the corresponding element in FIG. 1 will have the same reference numeral but designated with a star symbol (*).

We have learned that the olefins in the isomerization effluent stream concentrate as trans-2-butene and cis-2-butene. In an embodiment, a fractionation column that may be a depropanizer column 70* may produce an intermediate stream, a mid-cut from a side 102 of the depropanizer column in an intermediate line 99. The intermediate stream in line 99 may comprise a C4 stream which would comprise a predominance of the olefins. As used herein, the term "predominance" or "predominate" means greater than 50%, suitably greater than 75% and preferably greater than 90%.

The intermediate C4 stream rich in olefins is separated from a depropanizer bottoms stream comprising a C5+ stream in the depropanizer bottoms line 78 from which is taken the recycle stream in the recycle line 79 devoid or lean of olefins. The intermediate stream in line 99 may be fed to the line 119* and therein be fed to the stream cracking unit 150. It is also contemplated that the intermediate stream in line 99 could also be saturated in a saturation reactor and then recycled in the recycle stream 79 to the adsorption separation unit 12, but this embodiment is not shown. The remainder of FIG. 5 essentially operates and is configured as described for FIG. 1 and can be adapted to the embodiment of FIG. 2 by omitting the saturation reactor 80 therein.

Figure 6:
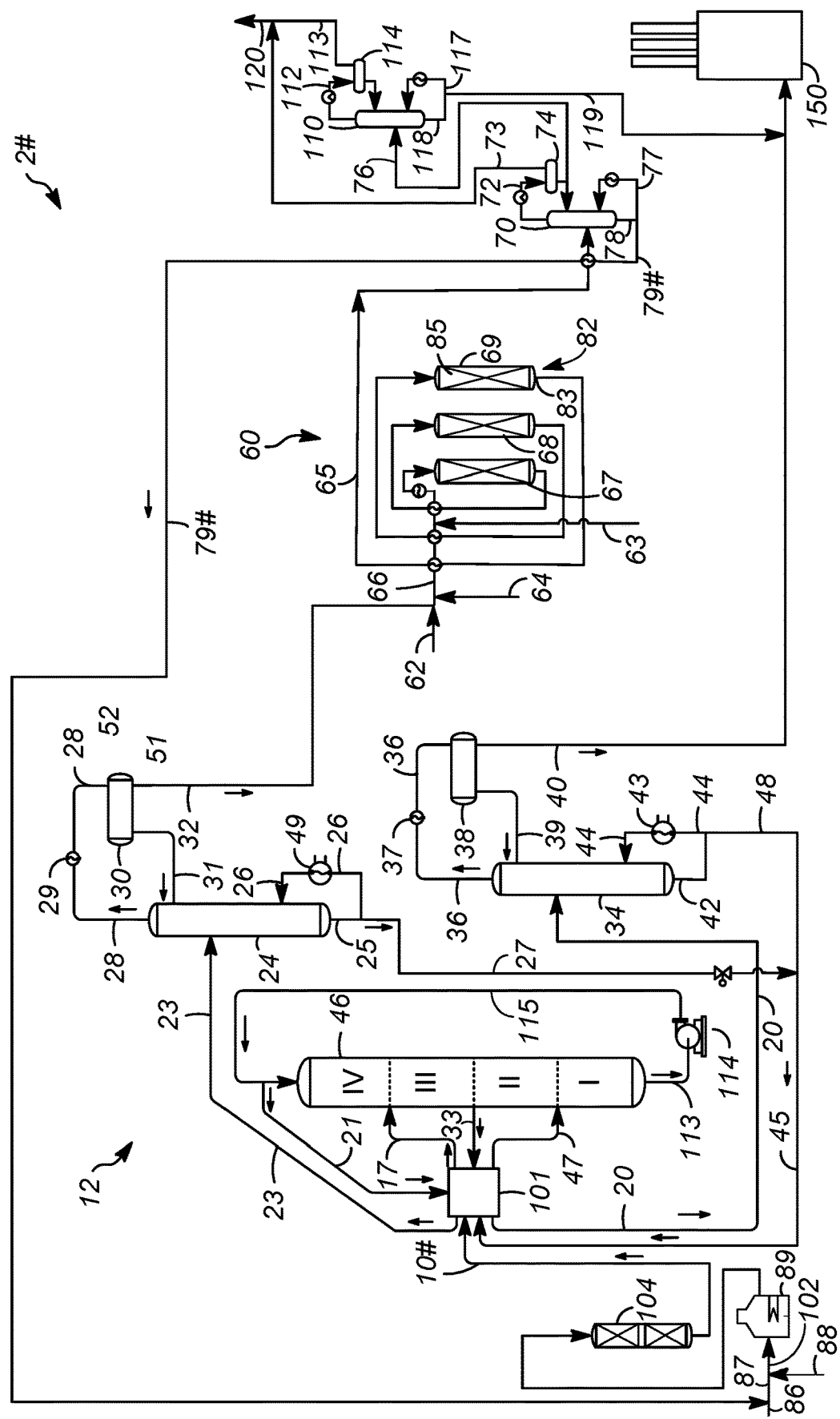
FIG. 6 is a schematic view of an even further alternate conversion unit of FIG. 1.

FIG. 6 shows an embodiment of a process and apparatus 2# in which the recycle stream in line 79# is hydrotreated with a raw naphtha feed stream 86 to prepare it for the adsorption separation unit 12. Elements in FIG. 6 with the same configuration as in FIG. 1 will have the same reference numeral as in FIG. 1. Elements in FIG. 6 which have a different configuration as the corresponding element in FIG. 1 will have the same reference numeral but designated with a hashtag symbol (#) in FIG. 6.

The raw naphtha feed stream in line 86 may be hydrotreated before it is fed to the adsorption separation unit 12. In an embodiment, the recycle stream in the recycle line 79# is combined with the raw naphtha stream in line 86 to provide a combined naphtha feed stream in line 87. A hydrogen stream in line 88 may be added to the combined naphtha feed stream in line 87 to provide a mixed feed stream in line 102. The hydrogen stream in line 88 may be compressed to hydrotreater pressure. The mixed feed stream in line 102 may be heated in a charge heater 89 and may be charged to the hydrotreating reactor 104.

Hydrotreating is a process wherein hydrocarbons are contacted with hydrogen in the presence of hydrotreating catalysts which are primarily active for the removal of heteroatoms, such as sulfur, nitrogen, oxygen and metals from the hydrocarbon feedstock. In hydrotreating, hydrocarbons with double and triple bonds such as olefins may be saturated. Aromatics may also be saturated. Some hydrotreating processes are specifically designed to saturate aromatics.

In an exemplary embodiment, the hydrotreating reactor 104 may comprise a guard bed of hydrotreating catalyst followed by one or more beds of higher activity hydrotreating catalyst. The guard bed filters particulates and reacts with contaminants in the hydrocarbon feed stream such as metals like nickel, vanadium, silicon and arsenic which are detrimental to the higher activity hydrotreating catalyst. The guard bed may comprise material similar to the hydrotreating catalyst.

Suitable hydrotreating catalysts for use in the present process may include any known conventional hydrotreating catalysts. The hydrotreating catalysts may comprise at least one Group VIII metal including iron, cobalt and nickel, or cobalt and/or nickel and at least one Group VI metal including molybdenum and tungsten, on a high surface area support material such as alumina. Other suitable hydrotreating catalysts may include zeolitic catalysts, as well as noble metal catalysts where the noble metal is selected from palladium and platinum. More than one type of hydrotreating catalyst may be used in the same hydrotreating reactor 104. In an exemplary embodiment, the Group VIII metal may be present in an amount ranging from about 2 wt % to about 20 wt %, or from about 4 wt % to about 12 wt %. In another exemplary embodiment, the Group VI metal may be present in an amount ranging from about 1 wt % to about 25 wt %, or from about 2 wt % to about 25 wt %.

The reaction conditions in the hydrotreating reactor 104 may include a temperature from about 290° C. (550° F.) to about 455° C. (850° F.), or from about 316° C. (600° F.) to about 427° C. (800° F.), a pressure from about 2.1 MPa (gauge) (300 psig), or from 4.1 MPa (gauge) (600 psig) to about 20.6 MPa (gauge) (3000 psig), or to about 12.4 MPa (gauge) (1800 psig), a liquid hourly space velocity of the hydrocarbon feed stream from about 0.1 $hr^{-1}$, or from about 4 $hr^{-1}$, to about 8 $hr^{-1}$, or from about 1.5 $hr^{-1}$ to about 3.5 $hr^{-1}$, and a hydrogen rate of about 168 Nm3/m3 (1,000 scf/bbl), to about 1,011 Nm3/m3 oil (6,000 scf/bbl), or from about 168 Nm3/m3 oil (1,000 scf/bbl) to about 674 Nm3/m3 oil (4,000 scf/bbl), with a hydrotreating catalyst or a combination of hydrotreating catalysts.

The hydrotreating reactor 104 saturates olefins in the raw naphtha feed in line 86 and trace olefins in the recycle stream in line 79# to below a Bromine Index limit of 150. The hydrotreating reactor 104 provides a hydrotreated naphtha feed stream that exits the hydrotreating reactor in line 10#. Depressurization, cooling and separation processing may be performed on the naphtha feed stream in line 10# before it is fed to the adsorption separation unit 12.

The remainder of FIG. 5 essentially operates and is configured as described for FIG. 1 and can be adapted to the embodiment of FIG. 2 by omitting the saturation reactor 80 therein.

Specific Embodiments

While the following is described in conjunction with specific embodiments, it will be understood that this description is intended to illustrate and not limit the scope of the preceding description and the appended claims.

A first embodiment of the disclosure is a process for increasing the concentration of normal paraffins in a feed stream comprising separating a naphtha feed stream into a normal paraffin stream and a non-normal paraffin stream; isomerizing an isomerization feed stream taken from the non-normal paraffin stream over an isomerization catalyst to convert non-normal paraffins to normal paraffins and produce an isomerization effluent stream; removing olefins from an isomerization effluent stream to provide a recycle stream; and recycling the recycle stream to the step of separating a naphtha feed stream. An embodiment of the disclosure is one, any or all of prior embodiments in this paragraph up through the first embodiment in this paragraph wherein the olefins are removed from the isomerization effluent stream by saturating the isomerization effluent stream. An embodiment of the disclosure is one, any or all of prior embodiments in this paragraph up through the first embodiment in this paragraph further comprising passing the isomerization effluent stream through a bed of saturation catalyst at the outlet of an isomerization reactor. An embodiment of the disclosure is one, any or all of prior embodiments in this paragraph up through the first embodiment in this paragraph wherein the saturation catalyst is in a catalyst bed in the downstream end of the isomerization reactor. An embodiment of the disclosure is one, any or all of prior embodiments in this paragraph up through the first embodiment in this paragraph wherein the saturation catalyst is in a reactor downstream of the isomerization reactor. An embodiment of the disclosure is one, any or all of prior embodiments in this paragraph up through the first embodiment in this paragraph further comprising fractionating the isomerization effluent stream to provide the recycle stream and saturating the recycle stream. An embodiment of the disclosure is one, any or all of prior embodiments in this paragraph up through the first embodiment in this paragraph wherein the recycle stream is a bottoms stream from a fractionation column. An embodiment of the disclosure is one, any or all of prior embodiments in this paragraph up through the first embodiment in this paragraph further comprising combining the recycle stream and the naphtha feed stream and saturating the combined feed stream. An embodiment of the disclosure is one, any or all of prior embodiments in this paragraph up through the first embodiment in this paragraph further comprising fractionating the isomerization effluent stream to separate a C4 stream rich in olefins from a C5+ stream and taking the C5+ stream as the recycle stream. An embodiment of the disclosure is one, any or all of prior embodiments in this paragraph up through the first embodiment in this paragraph further comprising feeding the C4 stream to a steam cracking unit. An embodiment of the disclosure is one, any or all of prior embodiments in this paragraph up through the first embodiment in this paragraph wherein the isomerization temperature is between about 160 and about 250° C. An embodiment of the disclosure is one, any or all of prior embodiments in this paragraph up through the first embodiment in this paragraph wherein the isomerization reactor is operated with hydrogen-to-hydrocarbon mole ratio of 0.05 to 1 at the outlet. An embodiment of the disclosure is one, any or all of prior embodiments in this paragraph up through the first embodiment in this paragraph wherein the isopentane conversion is at least 20% in the isomerization reactor. An embodiment of the disclosure is one, any or all of prior embodiments in this paragraph up through the first embodiment in this paragraph wherein isomerization reactor is operated with a weight space velocity of between about 1 and about 6 l/hr.

A second embodiment of the disclosure is a process for increasing the concentration of normal paraffins in a feed stream comprising separating a naphtha feed stream into a normal paraffin stream and a non-normal paraffin stream; isomerizing an isomerization feed stream taken from the non-normal paraffin stream over an isomerization catalyst to convert non-normal paraffins to normal paraffins and produce an isomerization effluent stream; saturating the isomerization effluent stream; and recycling the recycle stream to the step of separating a naphtha feed stream. An embodiment of the disclosure is one, any or all of prior embodiments in this paragraph up through the second embodiment in this paragraph wherein the saturation catalyst is in a catalyst bed in the downstream end of the isomerization reactor or in a reactor downstream of the isomerization reactor. An embodiment of the disclosure is one, any or all of prior embodiments in this paragraph up through the second embodiment in this paragraph further comprising fractionating the isomerization effluent stream to provide the recycle stream and saturating the recycle stream.

A third embodiment of the disclosure is an apparatus for increasing the concentration of normal paraffins in a feed stream comprising an adsorbent vessel for separating a naphtha feed stream into a normal paraffin stream and a non-normal paraffin stream; an isomerization reactor in downstream communication with the adsorbent vessel for isomerizing the non-normal paraffin stream over an isomerization catalyst to convert non-normal paraffins to normal paraffins and produce an isomerization effluent stream; a saturation reactor in downstream communication with the isomerization reactor for saturating olefins in the isomerization effluent stream; and a recycle line in downstream communication with the saturation reactor and the adsorbent vessel being in downstream communication with the recycle line. An embodiment of the disclosure is one, any or all of prior embodiments in this paragraph up through the third embodiment in this paragraph wherein the saturation reactor is in the downstream end of the isomerization reactor or in downstream communication with an outlet of the isomerization reactor. An embodiment of the disclosure is one, any or all of prior embodiments in this paragraph up through the third embodiment in this paragraph further comprising a fractionation column in downstream communication with the isomerization reactor for fractionating the isomerization effluent stream, wherein the saturation reactor is in downstream communication with a line from the fractionation column.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for increasing the concentration of normal paraffins in a feed stream comprising:
separating a naphtha feed stream into a normal paraffin stream and a non-normal paraffin stream;

isomerizing an isomerization feed stream taken from the non-normal paraffin stream over an isomerization catalyst to convert non-normal paraffins to normal paraffins and produce an isomerization effluent stream;

removing olefins from said isomerization effluent stream to provide a recycle stream; and recycling said recycle stream to the step of separating a naphtha feed stream.

2. The process of claim 1 wherein said olefins are removed from the isomerization effluent stream by saturating said isomerization effluent stream.

3. The process of claim 2 further comprising passing said isomerization effluent stream through a bed of saturation catalyst at the outlet of an isomerization reactor.

4. The process of claim 3 wherein the saturation catalyst is in a catalyst bed in the downstream end of the isomerization reactor.

5. The process of claim 3 wherein the saturation catalyst is in a reactor downstream of the isomerization reactor.

6. The process of claim 2 further comprising fractionating said isomerization effluent stream to provide said recycle stream and saturating said recycle stream.

7. The process of claim 6 wherein said recycle stream is a bottoms stream from a fractionation column.

8. The process of claim 6 further comprising combining said recycle stream and said naphtha feed stream and saturating the combined feed stream.

9. The process of claim 1 further comprising fractionating said isomerization effluent stream to separate a C4 stream rich in olefins from a C5+ stream and taking said C5+ stream as the recycle stream.

10. The process of claim 9 further comprising feeding said C4 stream to a steam cracking unit.

11. The process of claim 1 wherein said isomerization temperature is between about 160 and about 250° C.

12. The process of claim 1 wherein said isomerization reactor is operated with hydrogen-to-hydrocarbon mole ratio of 0.05 to 1 at the outlet.

13. The process of claim 1 wherein the isopentane conversion is at least 20% in the isomerization reactor.

14. The process of claim 1 wherein isomerization reactor is operated with a weight space velocity of between about 1 and about 6 1/hr.

15. A process for increasing the concentration of normal paraffins in a feed stream comprising:

separating a naphtha feed stream into a normal paraffin stream and a non-normal paraffin stream;

isomerizing an isomerization feed stream taken from the non-normal paraffin stream over an isomerization catalyst to convert non-normal paraffins to normal paraffins and produce an isomerization effluent stream;

saturating said isomerization effluent stream; and recycling said recycle stream to the step of separating a naphtha feed stream.

16. The process of claim 15 wherein the saturation catalyst is in a catalyst bed in the downstream end of the isomerization reactor or in a reactor downstream of the isomerization reactor.

17. The process of claim 15 further comprising fractionating said isomerization effluent stream to provide said recycle stream and saturating said recycle stream.

* * * * *